United States Patent Office 3,134,433
Patented May 26, 1964

3,134,433
METHOD OF SECONDARY RECOVERY OF HYDROCARBONS
Philip E. Bocquet, Albuquerque, N. Mex., and John N. Dew, Ponca City, Okla., assignors to Continental Oil Company, Ponca City, Okla., a corporation of Delaware
No Drawing. Filed Jan. 14, 1960, Ser. No. 2,326
11 Claims. (Cl. 166—9)

This invention relates to the recovery of hydrocarbons from formations within subterranean reservoirs, and more particularly it relates to an improved method of recovering hydrocarbons from subterranean oil-producing formations.

The production of hydrocarbons from a subterranean formation normally occurs in two general methods with regard to the energy source utilized in recovery. The first method of recovery is normally referred to in the industry as a primary recovery and infers the utilization of naturally occurring sources of energy. The primary recovery of oil is normally accomplished by water, gas, gravity, and any other natural forces which happen to occur within the reservoir and be capable of moving the oil to a recovery well. In this type of recovery there is no external energy applied to the subterranean reservoir except the normal pumping devices known within the art to raise the hydrocarbons to the surface.

The primary recovery of oil normally results in volumes which, though substantial, are only a minor amount of the oil actually occurring within the formation. The volume of recovery by the natural forces as set forth above is relatively poor and the efficiencies of such forces are so low that a majority of the oil normally remains in the formation after primary recovery efforts have been expended.

In contrast to primary recovery where naturally occurring forces are utilized to recover oil, the alternative method of recovery used to supplement said primary recovery is normally referred to as secondary recovery. The methods which are considered to be within the category of secondary recovery are generally defined as those methods which utilize forces which are developed by external energy being applied to the hydrocarbons within the subterranean reservoir. The general method of secondary recovery is to inject a displacing medium into the reservoir through an input well, displace the hydrocarbons from within the formation to an output well, and recover the hydrocarbons from said output or producing well. The displacing media which have become accepted as being conventional in the art include water, gases, liquefied hydrocarbons, and more recently heated gases developed by in situ combustion within the formation.

The secondary recovery of hydrocarbons from within a reservoir is dependent upon the degree of efficiency of the displacing media, and upon the volume of the reservoir which is contacted by the displacing medium. At the outset of the injection of the displacing media into the input well, the amount of recovery for each volume of injected media is a relatively high ratio, but this continues to decrease thereafter as the deposit within the reservoir is depleted further by the continued injection and recovery. As the displacing medium is injected into the formation the displacing front proceeds outwardly from the input well through the formation to the recovery well, wherein the formation factors of permeability, porosity, gravity, etc., become more increasingly important in controlling the efficiency of said displacing fluid. A point is reached at which the amount of oil displaced becomes minimal and the economic returns on the oil recovered by said method are undesirable, requiring that production efforts be terminated.

It has been determined by the application of the various secondary recovery methods in field situations that the utilization of gaseous medium as the displacing fluid results in an increase in recovery of approximately twenty percent (20%) of the original oil in place; the utilization of water as the displacing fluid results in an increase of approximately fifty percent (50%) of the oil originally in place; the utilization of in situ combustion as the displacing means results in an increase of approximately seventy percent (70%) of the oil originally in place; and the utilization of a miscible flood system, which involves the injection of a liquid hydrocarbon, etc., results in an increase of approximately eighty percent (80%) of the oil originally in place. Various methods have been proposed for improving this ultimate factor, but no completely satisfactory method has been developed at this time.

The volume of hydrocarbons recovered from a subterranean reservoir through the application of a method of secondary recovery is dependent upon two general factors. These factors are the volumetric efficiency of the displacing media, and the displacement efficiency of the displacing media. The prior art teaches that the utilization of the most efficient displacing medium, which would be a material as nearly identical to that of the formation hydrocarbon as is possible, would give the most efficient results. Economically, this volume for volume ratio is an unfeasible approach, so other efficient media or combinations must be utilized. The economics of the situation led to the utilization of natural gas in a gaseous phase as a displacing medium, but the efficiencies with regard to displacement as well as volumetric coverage were undesirably low. The poor recovery percentage, as set forth above, is due to the fact that gas fingers and channels excessively within the reservoir; therefore gas does not efficiently displace the hydrocarbons which it contacts as it passes through the formation, and it only passes through a minor portion of the formation due to the inherent fingering effect.

Subsequent to recovery by gas injection, the method of water flooding was developed which increased the degree of volumetric efficiency achieved by the flooding medium. A complete variance in the physical characteristics and behavior of water and hydrocarbonaceous materials within the formation exists, therefore water is an undesirable medium from a viewpoint of displacement efficiency. The combination of increased volumetric efficiency and decreased displacement efficiency resulted, however, in an increased overall efficiency and recovery percentage as set forth above.

The next development in the field of secondary recovery utilized a compromise between the above two and employed liquid hydrocarbons of suitable economics and efficiency which led to the secondary recovery of petroleum by miscible flooding. This allowed improved overall results by accepting lower volumetric efficiency and a raised displacement efficiency, but the overall efficiency was still below that which is desirable and possible by the method herein disclosed.

It is an object of this invention to provide an improved method of secondary recovery of hydrocarbons from subterranean reservoirs.

A further object of this invention is to provide a method of producing substantially all of the oil in a reservoir by utilizing a method of secondary recovery which includes utilizing displacing fluids of a miscible nature.

Another object of this invention is to provide an improved method of recovering hydrocarbons from a subterranean reservoir which includes the injection of hydrocarbons miscible with the oil in the formation in conjunction with water injection in order to obtain a percentage of recovery in the order of ninety percent (90%).

Other objects and advantages provided by this invention will be evident from the following description.

In brief this invention is an improved method of secondary recovery of hydrocarbons from subterranean reservoirs which comprises injecting alternate amounts of water and hydrocarbons with each successive hydrocarbonaceous slug of material being of reduced viscosity. This invention therefore achieves the desirable high volumetric efficiency of water in effective combination with the high displacement efficiency of hydrocarbons, while achieving a desirable economic balance within the overall operation.

It is acknowledged that the oil within a reservoir can be displaced to a substantially complete degree by a liquid which is sufficiently miscible with the oil of the formation in order that a single phase is created between the two hydrocarbons, thus avoiding the occurrence of an undesirable interface within the formation. This provides a short transition zone between the oil and oil miscible medium wherein the medium does not tend to bypass the oil, but rather displaces it efficiently. The volumetric efficiency of our method is achieved by introducing an injected slug of water into an input well in communication with the reservoir and displacing it into the formation as it is desirable.

The volumetric efficiency of a secondary recovery method is dependent upon overcoming the factors within the reservoir which prohibit horizontal displacement from occurring in a desirably uniform manner. These factors are numerous and variably dependent upon the formation but generally include vertical permeability, as opposed to horizontal porosity and permeability, impermeable factors within the formation, and other gelogical occurrences which disrupt the normally desirable uniform flow. Therefore the injection of water into the reservoir, with its acknowledged high volumetric efficiency, defines its ability to flow into more permeable strata and its unwillingness to flow within the less permeable strata. These flow characteristics establish water in a slugwise injection as a governing device for volumetric efficiency. The water therefore displaces hydrocarbons from the more permeable zones within the formation and conversely is unable to displace hydrocarbons from the less permeable zones.

Subsequent to the injection of a slug of water the next step of our invention is the injection of a slug of hydrocarbonaceous material which is miscible with the oil within the formation. The hydrocarbons which can be injected will be referred to herein as $C_1$, $C_2$, $C_3$, ... $C_7$, as representing methane, ethane, propane, butane, pentane, hexane, heptane. The above symbols represent the number of bonded carbon atoms in the compound and generally are a molecular weight range of the hydrocarbons. This range indicates the physical characteristics, such as volatility, viscosity, etc., which in turn determine the conduct and characteristics of each as a displacing medium. Each of these is completely miscible with the hydrocarbons of the reservoir because of the similarity of chemical structure, but the rates of miscibility are most favorable between hydrocarbon molecules having a similar molecular weight.

The first hydrocarbon injected should have a molecular weight most nearly approximating the oil within the reservoir, preferably in the order of $C_7$ economically available. This will provide the requisite efficiency to displace substantially all of the hydrocarbons with which it comes in contact with the most rapidity. The initial injection of displacement fluid into the formation can be water or hydrocarbon, dependent upon the wettability characteristics of the individual formation. It has been determined that the most successful results can be accomplished normally if a fluid having wetting characteristics in opposition to those of the formation is initially injected; that is to say, water into a hydrocarbon-wet formation, and hydrocarbon into a water-wet formation. This is not a necessity for workability, but it is the preferred approach in order to achieve the most desirable results.

In the hydrocarbon-wet formation, the formation is subjected initially to water injection, and thereafter a hydrocarbon slug of a viscous nature follows the initially injected water. Due to the reservoir mechanics the hydrocarbon slug flows most readily into the areas where water has not been effective as a displacing medium. The injected hydrocarbon is immiscible with the water due to chemical dissimilarity and avoids the portion of the reservoir wherein the water was most readily flowed and eventually deposited. Instead, the displacing hydrocarbon moves through that portion of the reservoir wherein the water slug was unable to pass with facility due to the lower permeability and presence of water immiscible oil therein. Since the water displaces the oil of the formation only because of the force exerted as an incompressible liquid, it is ineffective in the portions of reduced porosity and permeability, and the greater volumes of water are deposited in the most porous and permeable portions of the formation wherein the oil is more readily displaced. This increase of water present in the most porous and permeable zones reduces the permeability of this zone to the subsequently injected slug of displacing hydrocarbon.

The oil, which was bypassed by the water, is consequently contacted by a greater volume of the injected slug of hydrocarbon because the injected hydrocarbon is immiscible with the water and conversely displaces it only by the pressure exerted by it as an imcompressible liquid. The portion of the formation having greater porosity contains the largest volume of water, so the slug is directed into the less porous portion where the injected water was ineffective. The hydrocarbon displaces the water in the portions of lesser porosity and, due to the miscibility of the hydrocarbon with said oil within the reservoir, consequently achieves a very high displacement efficiency. This alternate slugwise injection of water followed by hydrocarbon concurrently tends to cause a uniform front of displacement to be moved across the formation in that the water displaced through the more porous region tends to plug said region to said hydrocarbons; therefore the subsequent hydrocarbons tend to be channeled into the less porous areas of the formation and thereby plug the less porous portion of the formation to subsequent injections of water.

Subsequent to this injection of hydrocarbon the next step in the method is to inject another slug of water to maintain the alternate slugwise procedure as disclosed herein by this method of secondary recovery. This water acts as the previous slug of water did upon the hydrocarbons contacted, except that it is now acting upon the previously injected hydrocarbons which have a reduced viscosity. This does not affect the mechanics of the method disclosed above but instead accomplishes the same displacement with increased volumetric and displacement efficiencies. The water again is directed to the more porous portion of the formation and is prohibited from flowing through the less porous portion of the formation, but does not achieve the high degree of volumetric efficiency normally expected through the utilization of water. The overall effect of the water, however, is more beneficial than the single large water flood injection in that the uniform vertical front tends to become more pronounced with reference to displacement within the formation as the alternate injection is accomplished each time.

In the water-wet formation, the formation is subjected initially to hydrocarbon injection, and thereafter a water slug follows the initially injected hydrocarbon. The mechanics of the method as applied to a reservoir of this nature are similar to those set forth in the above described oil-wet formation subsequent to the initial injection of hydrocarbon. Thereafter the method is applied in the same manner with insignificant difference in outcome regardless of the initial formation characteristics in regard to wettability.

The injection of water which is more dense than the injected hydrocarbons, coupled with the immiscible characteristics and viscosity of water allows the initial recovery to have a high volumetric sweep efficiency. Gravitational effects within the formation are normally adverse due to the density differential between water and the formation hydrocarbon, but it is economically feasible to inject sufficient quantities of water to overcome this effect. The water becomes valuable to obtain volumetric efficiency because it does not finger or channel due to the rate of flow or viscosity characteristics.

Adverse gravitational effects are avoided as the alternate injections of hydrocarbons are made because these have density characteristics which are more nearly similar. Therefore the amounts of hydrocarbons which must necessarily be injected can be very reduced in volume while maintaining overall efficiency and economics. The water initially injected utilizes available similarity of viscosity characteristics to achieve volumetric efficiency and the subsequently injected hydrocarbons utilize similarity of densities to maintain the volumetric efficiency.

The alternate injection of hydrocarbons of reduced viscosity between each interval of water enables the method to utilize the displacement efficiency which exists between the miscible hydrocarbons. As the viscosity becomes more reduced the water slugs become more effective in displacing the hydrocarbon which is contacted because the water operates strictly on the basis of force exerted due to weight and pressure. In other words the displacement properties of water are more effective as the viscosity of the hydrocarbons are reduced back through the series of injections into the formation, and the water becomes a more desirable displacement medium economically.

The next step in the method of secondary recovery disclosed in the invention is the injection of another hydrocarbonaceous material of reduced viscosity in comparison to the previously injected slug of hydrocarbon. The mechanics are as set forth above with regard to the hydrocarbon injected in a normal manner into the formation. Again the displacement efficiency of the hydrocarbon is utilized to establish a uniform fluid front, and this conforms to the formation mechanics as set forth above.

The grading back of the hydrocarbon injected thereafter allows a more uniform displacement to be established within the formation in conjunction with the water and also establishes the concurrent benefits of reducing the expense at each step, due to the fact that the hydrocarbons are graded back to natural gas. The injection of water in a slugwise manner between each step of hydrocarbon injected allows the overall volume of injected hydrocarbons to be reduced with the obvious economic advantages therein as well as increasing the overall efficiency of the method.

An alternative application of this method of secondary recovery can be accomplished in certain instances to advantage by injecting the displacing hydrocarbons in incremental amounts of the total volume required for each. The effect of injecting incremental amounts alternating with water injection between said incremental injection periods is to accomplish the effect of a simultaneous water and hydrocarbon injection. The water and the individual hydrocarbon which are injected into the formation retain their identity for a short distance into the formation, but prior to movement for any extended distance the two develop a homogeneity and move in a uniform manner.

In formations which have the requisite characteristics it can be most desirable to have the water and displacing hydrocarbon move through the same portion of the formation concurrently. This can be accomplished by the above method of incremental injection with the resultant simultaneous movement. This incremental injection makes it unnecessary to provide complicated surface equipment which would be necessary to actually achieve simultaneous injection at the well head. Therefore, it can be quite advantageous from a recovery efficiency standpoint to achieve simultaneous movement, and it can often be most economical also. The economics of the situation are achieved with regard to total input of hydrocarbonaceous material, and also with regard to flexibility of operation, especially when a local gasoline plant is utilized as a supply source for the displacing hydrocarbon.

The specific volumes of water and hydrocarbons which are to be injected into the formation to obtain the most efficient and economical recovery are dependent upon the individual reservoir characteristic, and can be readily determined by equations generally known in the art.

In order to disclose the nature of the present invention still more clearly the following illustrative examples will be given. It is to be understood that the invention is not to be limited to the specific conditions or details set forth in these examples except insofar as such limitations are specified in the appended claims.

EXAMPLE 1

A pilot test of the method of secondary recovery of this invention was made in an eighty (80) acre portion of a field located in Wyoming utilizing a five-spot well pattern of existing wells. The tested portion of the reservoir was approximately one-fifth (1/5) of the total reservoir which contained an oil-bearing sandstone having a net pay thickness of nine and one-half (9½) feet. The depth of pay sandstone was six thousand and five hundred (6500) feet where it had an overall porosity of fourteen percent (14%) and a permeability of 120 md. and an average water saturation of twenty-six and six-tenths percent (26.6%). Reservoir pressure was originally three thousand and two hundred (3200) p.s.i., but the pressure at the time of the miscible displacement pilot test was five hundred and eighty-seven (587) p.s.i. The reservoir temperature was one hundred and eighty-one degrees Fahrenheit (181° F.); the oil formation volume factor was one and thirty-four one hundreths (1.34); the primary production had been nineteen and two-tenths percent (19.2%) of the original oil in place; and the gas saturation at the commencement of the pilot test was nineteen and one-tenth percent (19.1%).

The following determinations are readily derived from the information set forth above:

(a) Pore volume of five spot=7758 x 80 acres x 9.5 feet x .14=825,000 bbls.
(b) Hydrocarbon space=825,000 x (1−.266)=605,000 bbls.
(c) Stock tank oil content=825,000 x (1−.266−.191) 1/1.34=334,000 bbls.

The four corner wells of the five spot were utilized as the injection wells and recovery was accomplished through the center well of the pattern. Injection was controlled to direct approximately equal volumes into each of the four wells and manipulation of other injections in that portion of the reservoir outside of the pilot area allowed the reservoir pressure to be balanced to prevent fluid migration into or out of the test area.

The formation characteristics were such that it was determined to be adaptable to inject alternate volumes of water and hydrocarbons in equal amounts of approximately fifteen thousand (15,000) barrels at reservoir conditions of temperature and pressure into each injection well. The hydrocarbons were average plant products from a nearby field gasoline plant which had the following compositions:

*Table of Composition (Mol Percent)*

|  | Methane | Ethane | Propane | Iso-Butane | N-Butane |
| --- | --- | --- | --- | --- | --- |
| Butane |  |  | 5.3 | 24.7 | 70.0 |
| Propane |  | 4.5 | 93.4 | 1.6 | .5 |
| Ethane Rich | 57.2 | 40.0 | 2.8 |  |  |
| Lean Gas | 88.5 | 8.5 | 2.5 | .2 | .3 |

The order of injection was butane, water, mixed L.P.G., water, propane, water, ethane rich gas enriched with propane, water, ethane rich gas, water, lean gas, and water with continued alternating lean gas and water injections.

Production was commenced when the reservoir pressure at the recovery well was eight hundred (800) p.s.i., since this assured the requisite pressure gradient to maintain miscibility between the hydrocarbons. The requisite pressure in this example was controlled by the pressure necessary for miscibility between propane and the ethane rich gas. The initial breakthrough of butane into the production well occurred after sixty-eight thousand (68,000) barrels Std., had been recovered. Total recovery of oil was 241,450 barrels Std., or 72.4% of the oil-in-place originally in the reservoir at a high injected fluid-oil ratio, and production was reaching the limit of economical attractiveness though an additional ten thousand (10,000) barrels of recovery was expected.

EXAMPLE 2

A pilot test of the method of secondary recovery of this invention in the same field as in Example 1 above in another eighty (80) acre portion utilizing a five-spot well pattern was made. All of the data and characteristics are identical except that the average net pay thickness of the sandstone was ten and one-half (10.5) feet.

The following determinations are readily derived from the foregoing information:

(a) Pore volume of five spot = 7758 x 80 acres x 10.5 feet x .14 = 910,000 bbls.

(b) Hydrocarbon space = 910,000 x (1−.266) = 668,000 bbls.

(c) Stock tank oil content = 910,000 x (1−.266−.191) x 1/1.34 = 369,000 bbls.

The four corner wells of the five spot were utilized as injection wells, and recovery was accomplished through the center well of the pattern. Injection was controlled to direct approximately equal volumes into each of the four wells and manipulation of other injections in that portion of the reservoir outside of the pilot area allowed the reservoir pressure to be balanced to prevent fluid migration into or out of the test area.

The formation characteristics were such that it was determined to be adaptable to inject alternate increments of water and hydrocarbons in amounts of 500 to 750 barrels at reservoir conditions of temperature and pressure until the desired total volumes of water and the specific hydrocarbon were accomplished. The controlling factor of supply made it attractive to inject the smaller increments to adjust to the output of the field gasoline plant.

The injection of alternate slugs of the small increments of water and the hydrocarbon has the effect of simultaneous injection due to the mixing that occurs in the formation. The injected hydrocarbons were of the compositions given in the table in the previous example.

The volumes, injected alternately in slugs of about 500 barrels, were 30,000 barrels of butane together with 37,000 barrels of water, 20,000 barrels of mixed L.P.G. together with 25,00 barrels of water, and 25,00 barrels of propane together with 33,000 barrels of water. These were followed by ethane rich gas and water in alternate slugs and then lean gas and water in alternate slugs until production became uneconomical. Production was initially delayed until the reservoir pressure was 800 p.s.i. Butane showed a breakthrough after 82,000 barrels of stock tank oil were recovered and the total recovery was 293,000 barrels with a final production rate of 5 barrels of oil per day.

It is understood that the above descriptions are given by way of illustration only, and not limitation, and that deviations are possible within the spirit of the invention.

The invention having thus been described, what is claimed and desired to be secured by Letters Patent is:

1. An improved method for the recovery of in situ hydrocarbons from a subterranean reservoir traversed by an injection well bore and a recovery well bore comprising injecting alternate volumes of water, and hydrocarbons of successively reduced viscosity through said injection well bore into the reservoir to displace hydrocarbons within the reservoir toward said recovery well bore, and producing in situ hydrocarbons through said recovery well bore to the surface.

2. An improved method for the recovery of in situ hydrocarbons from a partially depleted subterranean reservoir traversed by an injection well bore and a recovery well bore comprising injecting alternate volumes of water, and hydrocarbons of successively reduced molecular weight through the injection well bore into the reservoir to displace in situ hydrocarbons within the reservoir toward the recovery well bore, and producing in situ hydrocarbons from within said reservoir through the recovery well bore to the surface.

3. An improved method for the recovery of in situ hydrocarbons from a subterranean reservoir traversed by an injection well bore and a recovery well bore comprising injecting alternate volumes of water, and hydrocarbons of successively reduced molecular weight in the order of heptane, hexane, pentane, butane, propane, ethane, and methane through the injection well bore into the reservoir to displace in situ hydrocarbons within the reservoir toward said recovery well bore; and producing in situ hydrocarbons through said recovery well bore to the surface.

4. An improved method for the recovery of in situ hydrocarbons from a subterranean reservoir traversed by an injection well bore and a recovery well bore comprising injecting alternate volumes of water, and hydrocarbons of successively reduced viscosity through said injection well bore into the reservoir to displace in situ hydrocarbons within the reservoir toward the recovery well bore, injecting water ultimately through said injection well bore into the reservoir to displace injected hydrocarbons through the reservoir toward said recovery well bore, and producing hydrocarbons through said recovery well bore.

5. An improved method for the recovery of in situ hydrocarbons from a subterranean reservoir traversed by an injection well bore and a recovery well bore comprising injecting alternate volumes of water, and hydrocarbons of successively reduced viscosity through said injection well bore into the reservoir to displace in situ hydrocarbons within the reservoir toward the recovery well bore, injecting gaseous hydrocarbon through said injection well bore into the reservoir to displace hydrocarbons through the reservoir toward said recovery well bore, and producing hydrocarbons through said recovery well bore.

6. An improved method as defined in claim 1 wherein the reservoir is traversed by a plurality of injection well bores.

7. An improved method as defined in claim 1 wherein the reservoir is traversed by a plurality of recovery well bores.

8. An improved method as defined in claim 1 wherein the volumes of hydrocarbon are liquefied, normally gaseous, low molecular weight hydrocarbons.

9. An improved method as defined in claim 1 wherein water is the first alternate volume injected into the reservoir.

10. An improved method as defined in claim 1 wherein a hydrocarbon is the first alternate volume injected into the reservoir.

11. An improved method as defined in claim 1 wherein the water and individual hydrocarbons are injected in alternate incremental amounts until the total volume of each of said hydrocarbons is injected.

References Cited in the file of this patent

UNITED STATES PATENTS

| | | |
|---|---|---|
| 2,742,089 | Morse et al. | Apr. 17, 1956 |
| 2,771,139 | Johnson et al. | Nov. 20, 1956 |
| 2,867,277 | Weinaug et al. | Jan. 6, 1959 |
| 2,897,894 | Draper et al. | Aug. 4, 1959 |
| 2,927,637 | Draper | Mar. 8, 1960 |
| 2,988,142 | Maly | June 13, 1961 |

UNITED STATES PATENT OFFICE
CERTIFICATE OF CORRECTION

Patent No. 3,134,433                        May 26, 1964

Philip E. Bocquet et al.

It is hereby certified that error appears in the above numbered patent requiring correction and that the said Letters Patent should read as corrected below.

Column 3, line 48, for "gelogical" read -- geological --; column 8, line 9, for "25,00", each occurrence, read -- 25,000 --.

Signed and sealed this 1st day of December 1964.

(SEAL)
Attest:

ERNEST W. SWIDER                       EDWARD J. BRENNER
Attesting Officer                         Commissioner of Patents